(12) United States Patent
Nurminen et al.

(10) Patent No.: US 11,134,404 B2
(45) Date of Patent: Sep. 28, 2021

(54) MEASUREMENT PERIOD SCALING BASED ON DEVICE CAPABILITIES FOR SIMULTANEOUS MEASUREMENTS

(71) Applicant: NOKIA TECHNOLOGIES OY, Espoo (FI)

(72) Inventors: Riikka Karoliina Nurminen, Helsinki (FI); Lars Dalsgaard, Oulu (FI)

(73) Assignee: NOKIA TECHNOLOGIES OY, Espoo (FI)

( * ) Notice: Subject to any disclaimer, the term of this patent is extended or adjusted under 35 U.S.C. 154(b) by 323 days.

(21) Appl. No.: 16/349,351

(22) PCT Filed: Oct. 26, 2017

(86) PCT No.: PCT/EP2017/077485
§ 371 (c)(1),
(2) Date: May 13, 2019

(87) PCT Pub. No.: WO2018/086907
PCT Pub. Date: May 17, 2018

(65) Prior Publication Data
US 2019/0349801 A1    Nov. 14, 2019

(30) Foreign Application Priority Data
Nov. 11, 2016 (EP) .................. 16198382

(51) Int. Cl.
*H04L 12/00* (2006.01)
*H04W 24/10* (2009.01)
(Continued)

(52) U.S. Cl.
CPC ............ *H04W 24/10* (2013.01); *H04W 16/14* (2013.01); *H04W 84/042* (2013.01)

(58) Field of Classification Search
None
See application file for complete search history.

(56) References Cited

U.S. PATENT DOCUMENTS

2015/0063156 A1    3/2015  Chen et al.
2016/0073366 A1*   3/2016  Ng ..................... H04L 5/0048
                                                      370/329
(Continued)

OTHER PUBLICATIONS

International Search Report and Written Opinion dated Feb. 22, 2018 corresponding to International Patent Application No. PCT/EP2017/077485.

(Continued)

*Primary Examiner* — Noel R Beharry
*Assistant Examiner* — Lionel Preval
(74) *Attorney, Agent, or Firm* — Squire Patton Boggs (US) LLP

(57) ABSTRACT

In the context of measurement configuration in the presence of multiple carriers, and in particular supplementary cells, LAA SCells, a method is provided to scale the measurement period that takes into account the capability of the UE to perform, for example by means of multiple searchers or increased buffer capacity, to measure multiple carriers simultaneously. The method comprises determining a scaled period (p) according to the following equation: p=pDMTC*min[n, ceiling(NCC/NCC_support)]; selecting respective selected occasions for each of NCC carriers out of occasions for measuring a respective reference signal, wherein the occasions occur with the predefined period (pDMTC), and the respective selected occasions occur with the scaled period (p); and inhibiting a measuring of a respective reference signal at occasions different from the respective selected occasions for each of the NCC carriers.

17 Claims, 1 Drawing Sheet

S10
Determine scaled period:
$$p = p_{DMTC} * \min[n, \text{ceiling}(N_{CC}/ N_{CC\_support})]$$

S20
Select occasions for measuring DRS

S30
Inhibit measuring DRS at occasions different from selected occasions

(51) Int. Cl.
  *H04W 16/14*  (2009.01)
  *H04W 84/04*  (2009.01)

(56) References Cited

U.S. PATENT DOCUMENTS

2019/0223216 A1* 7/2019 Siomina ............ H04W 74/0808
2019/0306734 A1* 10/2019 Huang ................. H04W 24/10

OTHER PUBLICATIONS

Qualcomm Incorporated, "Measurements for LAA with multiple Scells," 3GPP Draft; R4-1609814, 3GPP TSG-RAN WG4 Meeting #81, Reno, USA, Nov. 14-18, 2016, Nov. 4, 2016, XP051195086.
Qualcomm Incorporated, "RRM Requirements for LAA," 3GPP Draft; R4-164127, 3GPP TSG-RAN WG4 Meeting #79, Nanjing, China, May 23-27, 2016, May 22, 2016, XP051107003.
Nokia, Alcatel-Lucent Shanghai Bell, "RRM requirements and scaling," 3GPP Draft; R4-1609752, 3GPP TSG-RAN WG4 Meeting #81, Reno, USA, Nov. 14-18, 2016, Nov. 4, 2016, XP051194743.

* cited by examiner

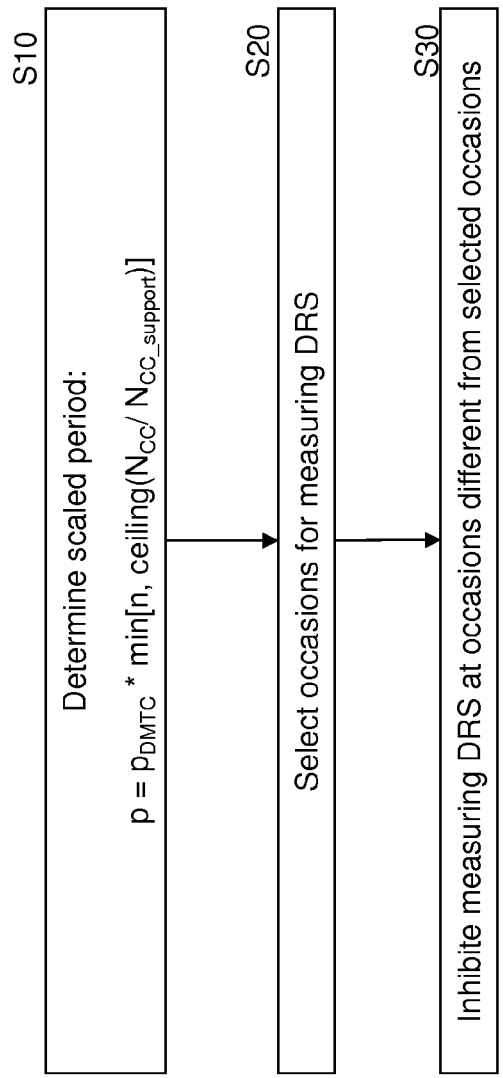
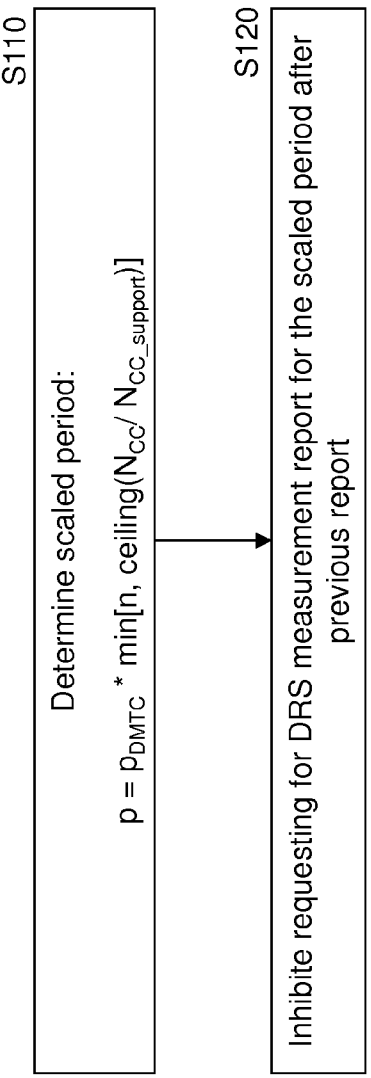
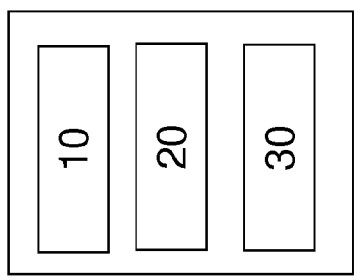
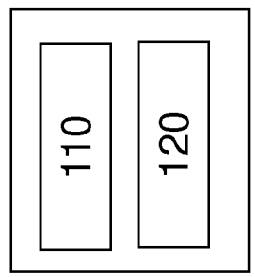
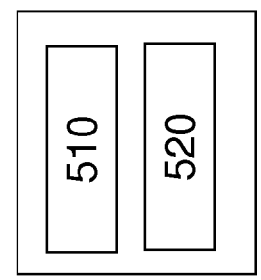

MEASUREMENT PERIOD SCALING BASED ON DEVICE CAPABILITIES FOR SIMULTANEOUS MEASUREMENTS

FIELD OF THE INVENTION

The present invention relates to an apparatus, a method, and a computer program product related to a mobile communication networks. More particularly, the present invention relates to an apparatus, a method, and a computer program product of a mobile network providing access in an unlicensed spectrum.

ABBREVIATIONS

3GPP Third Generation Partnership Project
4G $4^{th}$ Generation
5G $5^{th}$ Generation
CC Component Carrier
DMTC Discontinuous Measurement Timing Configuration
DRS Discovery Reference Signal
DRX Discontinuous Reception
eLAA enhanced LAA
LAA Licensed Assisted Access
LBT Listen Before Talk
LTE Long Term Evolution
LTE-A LTE-Advanced
NCC Number of CCs
NR Next generation Radio
PCell Primary Cell
QoS Quality of Service
RAN Radio Access Network
Rel Release
SCell Secondary Cell
TS Techncal Specification
TSG Technical Steerng Group
UE User Equipment
WG Working Group

BACKGROUND OF THE INVENTION

Spectrum is a scarce resource in mobile communication. There are two types of spectra: licensed and unlicensed. A licensed spectrum is exclusive to an operator. E.g. LTE and LTE-A are based on the assumption that the operator has a licensed spectrum. Thus, operator can control interference which is essential in order to provide a certain QoS.

An unlicensed spectrum may be used by everybody. Hence, interference cannot be predicted and QoS cannot be guaranteed.

A spectrum may be divided into carriers, each comprising a number of component carriers. For the present application, the terms "carrier" and "component carrier" are used synonymously, unless otherwise indicated or made clear from the context.

For example, in LAA, LTE technology (or some other radio technology, which was originally intended for a licensed spectrum, such as LTE-A), is deployed in an unlicensed spectrum. Thus, the operator of a licensed spectrum may gain additional bandwidth, which may be tightly coupled to LTE in the licensed spectrum. The LAA concept corresponds to that of carrier aggregation in LTE, wherein one or more SCells operate in the unlicensed spectrum, while the PCell operates in licensed spectrum. The PCell may substantially cover the SCell(s).

Typically, mobility, some control signaling, and services demanding a certain QoS are handled in the licensed spectrum, while SCells in the unlicensed spectrum handle non-demanding services (in terms of QoS).

In order to discover other cells in the unlicensed spectrum and to determine the quality of the downlink of a configured SCell in the unlicensed spectrum (i.e., a SCell serving the terminal at least in downlink), each of the cells sends downlink synchronization signals (which may also be used for measurements)—e.g. DRS in LAA. Typically downlink synchronization and/or measurement signals in general, are transmitted with certain periodicity and defined rules. E.g., DRS is sent at DMTC occasions with a predefined period of e.g. 40 ms, 80 ms, or 160 ms. In some cases, a DRS is not sent at each DMTC occasion, in LAA specifically due to channel assessment/listen before talk (LBT) result indicating that the channel is being occupied e.g. by WiFi or other technologies. Searching for other cells at different frequencies than that of a configured cell is sometimes also named e.g. "inter-frequency measurement". Searching for other cells at the same frequency as the configured cell and measurement of the downlink quality of a configured cell is also named "intra-frequency measurement".

On the other hand, the UE is configured with a DMTC, which defines a time window within which the UE can expect to receive the DRS. In LTE, the DRS occasion may be anywhere in the DMTC, but the duration between successive DRS transmissions from a given Scell is fixed (unless a DRS is not sent at a particular DRS occasion). In LAA, DRS can be located anywhere in the DMTC, and the period between two DRS occasions is not fixed. DRS may also be missing from a whole DMTC due to LBT failure. In LAA, the UE hence needs to confirm DRS presence in the DMTC. The UE does not necessarily know in which subframe DRS is transmitted, or if it is transmitted at all.

In order to perform inter-frequency measurements, the UE may be configured with measurement gaps during which it may re-tune to the carrier it has to perform measurements on. Hence, in some cases, the DMTC periodicity is a multiple of the measurement gap periodicity, such that DMTC is synchronous on all carriers. In some cases, eNB may configure UE to perform measurement on multiple frequencies at the same time. Alternatively, eNB may configure the measurements on each carrier separately with potentially different gap offsets.

In 3GPP Rel-13, only one CC may be configured per UE. However, in 3GPP Rel-14, support of multiple CCS is foreseen. Scaling the LAA cell identification and measurement requirements for multiple CC support in Rel-14 and for gap-assisted inter-frequency measurements has been discussed during the LAA and eLAA work items. "Scaling" means that a DRS measurement on a certain carrier is performed with a longer period than the DMTC period. More in detail, if the DMTC period is $p_{DMTC}$, a scaled period is $m*p_{DMTC}$ with m: natural number equal to or larger than 2. That is, the DRS on this channel is measured less frequently than it is transmitted on the channel.

Two issues have been brought up during the discussions:
1. Intra-frequency measurements
2. Simultaneous measurements on multiple CCs
1. Inter-Frequency Measurements (Applies from Rel-13 and Forward)

The problem with intra-frequency measurements in LAA is that if DMTCs in configured CC (only one CC can be configured in Rel-13) and the other measured inter-frequency carriers are overlapping, the UE is not able to measure DRS on active CC while it performs inter-frequency measurements during measurement gaps. Reason being that the DMTC and measurement gaps may overlap with activated SCell own DMTC. Thus, it has been proposed that in case the UE is performing simultaneous intra- and inter-frequency measurements, the intra-frequency requirement is scaled with the number of measured frequencies Nfreq. On the other hand, it has been pointed out that in case measurement gaps are not overlapping with DMTC occasions on the active SCell(s) (in Rel-14 more than one SCells can be configured), scaling is not necessary. Hence, an alternative is to allow scaling only if the gaps and DMTCs are overlapping.

As it is possible for the network to configure measurement gaps and DMTC occasions not to overlap, it is not always necessary to introduce scaling for such case. Therefore, in some deployments, scaling may only be allowed if measurement gaps and DMTC occasions are overlapping.

2. Requirements for Multiple CCs (Applies only for from Rel-14)

If multiple SCells are configured, it is relevant how many CCs (i.e. DRS on CCs) the UE is able to measure simultaneously, when DMTC occasions are overlapping in different CCs. This is mainly a question of UE buffering capability, and the amount of searchers supported by the UE. It has been pointed out that simultaneous measurements on multiple carriers would cause troubles for some UE implementations. In order to address this problem, it was initially proposed that the measurement period p would be scaled with the number of configured CCs $N_{CC}$ [3GPP R4-168311], i.e. $p=p_{DMTC}*N_{CC}$.

As support of full scaling with the number of configured CCs would cause measurement times delays to grow unreasonably long, there has been attempts in RAN4 to find a compromise that would decrease UE buffering complexity, but simultaneously not extend the measurement time delays too long much. One proposal was that measurement period p is scaled with factor min(3, $N_{CC}$), i.e. $p=p_{DMTC}*\min(3, N_{CC})$.

Scaling the measurement period may be needed where DMTCs are overlapping in time in different carriers. However, this may not always be the case. If the network configures DMTCs in different carriers to not overlap, scaling should not be allowed.

In addition, in a case where DMTCs are overlapping in the measured carriers, UEs supporting increased buffering capability or having increased searcher support should get the full benefit of such implementation as much as possible. However, if a UE is not able to perform measurements in all carriers within the DMTC, scaling could be allowed to some extent, for example to a maximum scaling factor of 3, as it was discussed above.

However, as the UE may have multiple searchers, or increased buffer capacity, and may therefore be able to measure multiple carriers simultaneously, it should be made sure that scaling is not done unnecessarily. For example, if the UE has two searchers and is measuring two carriers, scaling factor with min(3, $N_{CC}$) would be 2. With two searchers, scaling would however not be necessary in this case, so it should be made sure that the UE uses its full capability and get full benefit from the increased complexity.

A corresponding problem will be present also in Multe-Fire and likely in NR/5G.

REFERENCES

[1] R4-165760, Measurements for LAA with multiple Scells, Qualcomm Incorporated, 3GPP TSG-RAN WG4 Meeting #80, Gothenburg, Sweden, August, 2016.

[2] R4-165759, Corrections to inter-frequency measurements for LAA, Qualcomm Incorporated, 3GPP TSG-RAN WG4 Meeting #80, Gothenburg, Sweden, August, 2016.

[3] R4-166833, Applicability of intra-frequency maximum measurement time requirements, Ericsson, 3GPP TSG-RAN WG4 Meeting #80, Gothenburg, Sweden, August, 2016.

[4] R4-168296, Scaling RRM requirements with the number of component carriers, Nokia, Alcatel-Lucent Shanghai Bell, 3GPP TSG-RAN WG4 Meeting #80bis Ljubljana, Slovenia, October, 2016.

SUMMARY OF THE INVENTION

It is an object of the present invention to improve the prior art.

According to a first aspect of the invention, there is provided an apparatus, comprising at least one processor, at least one memory including computer program code, and the at least one processor, with the at least one memory and the computer program code, being arranged to cause the apparatus to at least perform at least determining a scaled period p according to the following equation: $p=p_{DMTC}*\min[n, \text{ceiling}(N_{CC}/N_{CC\_support})]$; selecting respective selected occasions for each of $N_{CC}$ carriers out of occasions for measuring a respective reference signal, wherein the occasions occur with the predefined period $p_{DMTC}$, and the respective selected occasions occur with the scaled period p; inhibiting a measuring of a respective reference signal at occasions different from the respective selected occasions for each of the $N_{CC}$ carriers; wherein the apparatus is capable of measuring the respective reference signals simultaneously on a predefined maximum number of the carriers or on less than the predefined maximum number of the carriers; $N_{CC\_support}$ depends on the predefined maximum number; n is a predefined natural number equal to or larger than 2.

The at least one memory and the computer program code may be arranged to cause the apparatus to further perform measuring the respective reference signal on each of the $N_{CC\_support}$ at the respective selected occasions.

The at least one memory and the computer program code may be arranged to cause the apparatus to further perform informing a network on the predefined number of carriers $N_{CC\_support}$, wherein the apparatus may be served by the network on at least one of the carriers.

The predefined natural number n may be 3. $N_{CC\_support}$ may be the predefined maximum number.

The at least one memory and the computer program code may be arranged to cause the apparatus to further perform calculating $N_{CC\_support}$ based on the predefined maximum number and at least one of a received measurement configuration and respective configurations of the $N_{CC}$ carriers.

According to a second aspect of the invention, there is provided an apparatus, comprising at least one processor, at least one memory including computer program code, and the at least one processor, with the at least one memory and the computer program code, being arranged to cause the apparatus to at least perform at least determining a scaled period p according to the following equation: $p=p_{DMTC}*\min[n, \text{ceiling}(N_{CC}/N_{CC\_support})]$; inhibiting requesting a terminal to report on a second measurement of a reference signal for the scaled period p after the terminal was requested to report on a first measurement of the reference signal; wherein $p_{DMTC}$ is a predefined period of time; the number $N_{CC\_support}$ is received from the terminal; $N_{CC}$ is a number of carriers, wherein the terminal is instructed to measure a respective reference signal on each of the $N_{CC}$ carriers; n is a predefined natural number equal to or larger than 2. The predefined natural number n may be 3.

According to a third aspect of the invention, there is provided a method, comprising determining a scaled period p according to the following equation: $p=p_{DMTC}*\min[n, \text{ceiling}(N_{CC}/N_{CC\_support})]$; selecting respective selected occasions for each of $N_{CC}$ carriers out of occasions for measuring a respective reference signal, wherein the occasions occur with the predefined period $p_{DMTC}$, and the respective selected occasions occur with the scaled period p; inhibiting a measuring of a respective reference signal at occasions different from the respective selected occasions for each of the $N_{CC}$ carriers; wherein an apparatus performing the method is capable of measuring the respective reference signals simultaneously on a predefined maximum number of the carriers or on less than the predefined maximum number of the carriers; $N_{CC\_support}$ depends on the predefined maximum number; n is a predefined natural number equal to or larger than 2.

The method may further comprise measuring the respective reference signal on each of the $N_{CC}$ carriers at the respective selected occasions.

The method may further comprise informing a network on the predefined number of carriers $N_{CC\_support}$, wherein the method is served by the network on at least one of the carriers.

The predefined natural number n may be 3. $N_{CC\_support}$ may be the predefined maximum number.

The method may further comprise calculating $N_{CC\_support}$ based on the predefined maximum number and at least one of a received measurement configuration and respective configurations of the $N_{CC}$ carriers.

According to a fourth aspect of the invention, there is provided a method, comprising determining a scaled period p according to the following equation: $p=p_{DMTC}*\min[n, \text{ceiling}(N_{CC}/N_{CC\_support})]$; inhibiting requesting a terminal to report on a second measurement of a reference signal for the scaled period p after the terminal was requested to report on a first measurement of the reference signal; wherein $p_{DMTC}$ is a predefined period of time; the number $N_{CC\_support}$ is received from the terminal; $N_{CC}$ is a number of carriers, wherein the terminal is instructed to measure a respective reference signal on each of the $N_{CC}$ carriers; n is a predefined natural number equal to or larger than 2. The predefined natural number n may be 3.

Each of the methods of the third and fourth aspects may be a method of scaling.

According to a fifth aspect of the invention, there is provided a computer program product comprising a set of instructions which, when executed on an apparatus, is configured to cause the apparatus to carry out the method according to any of the third and fourth aspects. The computer program product may be embodied as a computer-readable medium or directly loadable into a computer.

According to some embodiments of the invention, at least one of the following advantages may be achieved:

UEs may exploit their specific capabilities with respect to searching and buffering;
Measurement latencies are reduced;
Limited additional signaling between UE and network;
Network may not unnecessarily request the UE to report measurements;
Backwards compatibility.

It is to be understood that any of the above modifications can be applied singly or in combination to the respective aspects to which they refer, unless they are explicitly stated as excluding alternatives.

BRIEF DESCRIPTION OF THE DRAWINGS

Further details, features, objects, and advantages are apparent from the following detailed description of the preferred embodiments of the present invention which is to be taken in conjunction with the appended drawings, wherein:

FIG. 1 shows an apparatus according to an embodiment of the invention;

FIG. 2 shows a method according to an embodiment of the invention;

FIG. 3 shows an apparatus according to an embodiment of the invention;

FIG. 4 shows a method according to an embodiment of the invention; and

FIG. 5 shows an apparatus according to an embodiment of the invention.

DETAILED DESCRIPTION OF CERTAIN EMBODIMENTS

Herein below, certain embodiments of the present invention are described in detail with reference to the accompanying drawings, wherein the features of the embodiments can be freely combined with each other unless otherwise described. However, it is to be expressly understood that the description of certain embodiments is given by way of example only, and that it is by no way intended to be understood as limiting the invention to the disclosed details.

Moreover, it is to be understood that the apparatus is configured to perform the corresponding method, although in some cases only the apparatus or only the method are described.

According to some embodiments of the invention, the scaling factor is $\min[n, \text{ceiling}(N_{CC}/N_{CC\_support})]$, that is the scaled measurement period p is $p=p_{DMTC}*\min[n, \text{ceiling}(N_{CC}/N_{CC\_support})]$. $N_{CC\_support}$ is the number of respective DRS on carriers the UE is able to measure simultaneously. $N_{CC\_support}$ depends on the UE implementation, so it may be different for different UEs. n is a predefined natural number equal to or larger than 2 indicating the maximum scaling factor. E.g., n=3.

In some embodiments, $p_{DMTC}$ is the predefined DMTC period. In some embodiments, if DRX is activated, $p_{DMTC}$ is the DRX period, and if DRX is not activated, $p_{DMTC}$ is the predefined DMTC period. In general, $p_{DMTC}$ is a predefined period of time.

Some values for $N_{CC\_support}$ and $\min[3, \text{ceiling}(N_{CC}/N_{CC\_support})]$ are shown in Table 1:

TABLE 1

Scaling factor for different values of $N_{CC}$ and $N_{CC\_support}$
Scaling factor = min[3, ceiling(Ncc/Ncc_support)]

| | UE capability to do simultaneous measurements $N_{CC\_support}$ | | | |
|---|---|---|---|---|
| Ncc | 1 | 2 | 3 | 4 |
| 1 | 1 | 1 | 1 | 1 |
| 2 | 2 | 1 | 1 | 1 |
| 3 | 3 | 2 | 1 | 1 |

TABLE 1-continued

Scaling factor for different values of $N_{CC}$ and $N_{CC\_support}$
Scaling factor = min[3, ceiling($N_{cc}/N_{cc\_support}$)]

| Ncc | UE capability to do simultaneous measurements $N_{cc\_support}$ | | | |
|---|---|---|---|---|
| | 1 | 2 | 3 | 4 |
| 4 | 3 | 2 | 2 | 1 |
| 5 | 3 | 3 | 2 | 2 |
| 6 | 3 | 3 | 2 | 2 |
| 7 | 3 | 3 | 3 | 2 |
| 8 | 3 | 3 | 3 | 2 |
| 9 | 3 | 3 | 3 | 3 |
| 10 | 3 | 3 | 3 | 3 |

In some embodiments, the scaling factor may be applied to both intra-frequency measurements and inter-frequency measurements. In some embodiments, the scaling factor may be applied to intra-frequency measurements only, whereas the inter-frequency measurements are performed with the period $p_{DMTC}$. Intra-frequency measurements of a cell in the licensed spectrum may not be affected.

In some embodiments, the UE may determine $N_{CC\_support}$ based on its capability for simultaneous measurements of e.g. DRS on different carriers and in addition on the received measurement configuration and current CC configuration. Thus, it may take into account if certain DMTC are overlapping or not.

By the above scaling factor, the advantages of the proposals of the prior art discussed hereinabove are combined into a single arithmetic formula depending on parameters $N_{CC}$ and $N_{CC\_support}$ known to the UE. The network is aware of $N_{CC}$, too, because it configures the UE accordingly, but it is not necessarily aware of $N_{CC\_support}$.

In some embodiments of the invention, UE indicates the value of $N_{CC\_support}$ to the network. The value may be included in the UE capability report but it may also be part of another, potentially more flexible on-the-fly information e.g. related to UE measurement capability based on the received network measurement configuration. Also, $N_{CC\_support}$ may be transmitted to the network in a dedicated message.

Thus, the network is aware on the applied scaling factor, too, which enables flexible UE implementation and device competition. In particular, the network (represented by eNB) may not request a new measurement report from the UE during the scaled measurement period p after a measurement report because it knows that a new measurement will be performed only with the scaled measurement period p. Thus, unnecessary requests for measurement reports may be avoided.

Based on the scaling factor min[n, ceiling($N_{CC}/N_{CC\_support}$)], the maximum number of supported carriers for the UE is n*$N_{CC\_support}$. To support any larger number of carriers, UE would need to add its capability, which would increase the value of $N_{CC\_support}$.

FIG. 1 shows an apparatus according to an embodiment of the invention. The apparatus may be a UE or an element thereof. FIG. 2 shows a method according to an embodiment of the invention. The apparatus according to FIG. 1 may perform the method of FIG. 2 but is not limited to this method. The method of FIG. 2 may be performed by the apparatus of FIG. 1 but is not limited to being performed by this apparatus.

The apparatus comprises determining means (10), selecting means (20), and inhibiting means (30). The determining means (10), selecting means (20), and inhibiting means (30) may be a determining processor, selecting processor, and inhibiting processor, respectively.

The determining means (10) determines a scaled period p according to the following equation (S10):

$$p = p_{DMTC} * \min[n, \text{ceiling}(N_{CC}/N_{CC\_support})].$$

$p_{DMTC}$ is a predefined period. $N_{CC}$ is a number of carriers on which DRS is to be measured. $N_{CC\_support}$ depends on a predefined maximum number of carriers on which the UE can measure DRS simultaneously. That is, the UE may measure on the predefined maximum number of carriers (in an example embodiment: on 3 carriers) or on less than the predefined maximum number of carriers (on 2 carriers or on 1 carrier in the example embodiment) but not on more than the predefined maximum number of carriers. In some embodiments, $N_{CC\_support}$ may be equal to that maximum number. n is a predefined natural number equal to or larger than 2, e.g. n=3.

The selecting means (20) selects respective selected occasions for each of the $N_{CC}$ carriers out of occasions for measuring a respective reference signal (S20). The occasions occur with the predefined period $p_{DMTC}$. The selected occasions occur with the scaled period p.

The inhibiting means (30) inhibits measuring of the respective reference signal at occasions different from the respective selected occasions for each of the $N_{CC}$ carriers (S30). I.e., the inhibiting means allows measuring the DRS only at the respective selected occasions.

FIG. 3 shows an apparatus according to an embodiment of the invention. The apparatus may be a base station, such as a eNB or NB, or an element thereof. FIG. 4 shows a method according to an embodiment of the invention. The apparatus according to FIG. 3 may perform the method of FIG. 4 but is not limited to this method. The method of FIG. 4 may be performed by the apparatus of FIG. 3 but is not limited to being performed by this apparatus.

The apparatus comprises determining means (110) and inhibiting means (120). The determining means (110) and inhibiting means (120) may be a determining processor and inhibiting processor, respectively.

The determining means (110) determines a scaled period p according to the following equation (S110):

$$p = p_{DMTC} * \min[n, \text{ceiling}(N_{CC}/N_{CC\_support})].$$

$p_{DMTC}$ is a predefined period of time. The number $N_{CC\_support}$ is received from a terminal. $N_{CC}$ is a number of carriers, wherein the terminal is instructed to measure a respective reference signal on each of the $N_{CC}$ carriers. n is a predefined natural number equal to or larger than 2, e.g. n=3.

The inhibiting means (120) inhibits requesting a terminal to report on a second measurement of a reference signal for the scaled period p after the terminal was requested to report on a first measurement of the reference signal (S120).

FIG. 5 shows an apparatus according to an embodiment of the invention. The apparatus comprises at least one processor (510), at least one memory (520) including computer program code, and the at least one processor (510), with the at least one memory (520) and the computer program code, being arranged to cause the apparatus to at least perform at least one of the methods according to FIGS. 2 and 4.

Embodiments of the invention may be employed in a 3GPP network such as LTE or LTE-A, or in a 5G network. They may be employed also in other communication networks such as CDMA, EDGE, UTRAN networks, etc.

A user equipment may be e.g. a mobile phone, a smart phone, a PDA, a laptop, a tablet PC, a wearable, a machineto-machine device, or any other device which may be connected to the respective mobile network. If not otherwise indicated or made clear from the context, a UE is considered to include the meaning of a terminal for a user (typically a subscriber of the mobile network) and the meaning of a terminal without a user such as a machine-to-machine device.

One piece of information may be transmitted in one or plural messages from one entity to another entity. Each of these messages may comprise further (different) pieces of information.

Names of network elements, protocols, and methods are based on current standards. In other versions or other technologies, the names of these network elements and/or protocols and/or methods may be different, as long as they provide a corresponding functionality.

If not otherwise stated or otherwise made clear from the context, the statement that two entities are different means that they perform different functions. It does not necessarily mean that they are based on different hardware. That is, each of the entities described in the present description may be based on a different hardware, or some or all of the entities may be based on the same hardware. It does not necessarily mean that they are based on different software. That is, each of the entities described in the present description may be based on different software, or some or all of the entities may be based on the same software.

According to the above description, it should thus be apparent that example embodiments of the present invention provide, for example a UE, or a component thereof, an apparatus embodying the same, a method for controlling and/or operating the same, and computer program(s) controlling and/or operating the same as well as mediums carrying such computer program(s) and forming computer program product(s). According to the above description, it should thus be apparent that example embodiments of the present invention provide, for example a network, represented by e.g. a eNB or NodeB, or a component thereof, an apparatus embodying the same, a method for controlling and/or operating the same, and computer program(s) controlling and/or operating the same as well as mediums carrying such computer program(s) and forming computer program product(s).

Implementations of any of the above described blocks, apparatuses, systems, techniques or methods include, as non-limiting examples, implementations as hardware, software, firmware, special purpose circuits or logic, general purpose hardware or controller or other computing devices, or some combination thereof.

It is to be understood that what is described above is what is presently considered the preferred embodiments of the present invention. However, it should be noted that the description of the preferred embodiments is given by way of example only and that various modifications may be made without departing from the scope of the invention as defined by the appended claims.

The invention claimed is:

1. Apparatus, comprising: at least one processor; at least one memory including computer program code; and the at least one processor, with the at least one memory and the computer program code, being arranged to cause the apparatus to perform determining a scaled period p according to the following equation:

$$p = pDMTC * \min[n, \text{ceiling}(NCC/NCC\_support)];$$

selecting respective selected occasions for each of NCC carriers out of occasions for measuring a respective reference signal, wherein the occasions occur with the predefined period pDMTC, and the respective selected occasions occur with the scaled period p;

inhibiting a measuring of a respective reference signal at occasions different from the respective selected occasions for each of the NCC carriers;

measuring the respective reference signals simultaneously on a predefined maximum number of the carriers or on less than the predefined maximum number of the carriers;

wherein NCC_support depends on the predefined maximum number;

NCC is a number of carriers;

n is a predefined natural number equal to or larger than 2.

2. The apparatus according to claim 1, wherein the at least one memory and the computer program code, is arranged to cause the apparatus to further perform measuring the respective reference signal on each of the $N_{CC}$ carriers at the respective selected occasions.

3. The apparatus according to claim 1, wherein the at least one memory and the computer program code, is arranged to cause the apparatus to further perform informing a network on the predefined number of carriers $N_{CC\_support}$, wherein the apparatus is served by the network on at least one of the carriers.

4. The apparatus according to claim 1, wherein the predefined natural number n=3.

5. The apparatus according to claim 1, wherein $N_{CC\_support}$ is the predefined maximum number.

6. The apparatus according to claim 1, wherein the at least one memory and the computer program code, is arranged to cause the apparatus to further perform calculating $N_{CC\_support}$ based on the predefined maximum number and at least one of a received measurement configuration and respective configurations of the $N_{CC}$ carriers.

7. Apparatus, comprising:

at least one processor;

at least one memory including computer program code; and the at least one processor, with the at least one memory and the computer program code, being arranged to cause the apparatus to perform determining a scaled period p according to the following equation:

$$p = p_{DMTC} * \min[n, \text{ceiling}(N_{CC}/N_{CC\_support})];$$

inhibiting requesting a terminal to report on a second measurement of a reference signal for the scaled period p after the terminal was requested to report on a first measurement of the reference signal; wherein $p_{DMTC}$ is a predefined period of time;

the number $N_{CC\_support}$ is received from the terminal;

$N_{CC}$ is a number of carriers, wherein the terminal is instructed to measure a respective reference signal on each of the $N_{CC}$ carriers;

n is a predefined natural number equal to or larger than 2.

8. The apparatus according to claim 1, wherein the predefined natural number n=3.

9. A method for configuring measurements in a mobile communication network, comprising determining a scaled period p according to the following equation:

$$p = p\text{DMTC} * \min[n, \text{ceiling}(NCC/NCC\_support)];$$

selecting respective selected occasions for each of NCC carriers out of occasions for measuring a respective reference signal, wherein the occasions occur with the predefined period pDMTC, and the respective selected occasions occur with the scaled period p;

inhibiting a measuring of a respective reference signal at occasions different from the respective selected occasions for each of the NCC carriers;

measuring the respective reference signals simultaneously on a predefined maximum number of the carriers or on less than the predefined maximum number of the carriers;

wherein NCC_support depends on the predefined maximum number;

NCC is a number of carriers;

n is a predefined natural number equal to or larger than 2.

10. The method according to claim 9, further comprising measuring the respective reference signal on each of the $N_{CC}$ carriers at the respective selected occasions.

11. The method according to claim 9, further comprising informing a network on the predefined number of carriers $N_{CC\_support}$, wherein the method is served by the network on at least one of the carriers.

12. The method according to claim 9, wherein the predefined natural number n=3.

13. The method according to claim 9, wherein $N_{CC\_support}$ is the predefined maximum number.

14. The method according to claim 9, further comprising calculating $N_{CC\_support}$ based on the predefined maximum number and at least one of a received measurement configuration and respective configurations of the $N_{CC}$ carriers.

15. A method for configuring measurements in a mobile communication network, comprising determining a scaled period p according to the following equation:

$$p = p_{DMTC} * \min[n, \text{ceiling}(N_{CC}/N_{CC\_support})];$$

inhibiting requesting a terminal to report on a second measurement of a reference signal for the scaled period p after the terminal was requested to report on a first measurement of the reference signal; wherein $p_{DMTC}$ is a predefined period of time;

the number $N_{CC\_support}$ is received from the terminal;

$N_{CC}$ is a number of carriers, wherein the terminal is instructed to measure a respective reference signal on each of the $N_{CC}$ carriers;

n is a predefined natural number equal to or larger than 2.

16. The method according to claim 15, wherein the predefined natural number n=3.

17. A computer program product embodied on a non-transitory computer-readable medium, said product comprising a set of instructions which, when executed on an apparatus, is configured to cause the apparatus to carry out the method according to claim 9.

* * * * *